UNITED STATES PATENT OFFICE.

ANDREW MALINOVSZKY, OF CHICAGO, ILLINOIS, ASSIGNOR TO HARRY H. RANDOLPH, OF CHICAGO, ILLINOIS.

CERAMIC MATERIAL.

1,110,449.  Specification of Letters Patent.  Patented Sept. 15, 1914.

No Drawing.  Application filed March 13, 1912.  Serial No. 683,533.

*To all whom it may concern:*

Be it known that I, ANDREW MALINOVSZKY, a citizen of the United States, residing at Chicago, in the county of Cook and State of Illinois, have invented certain new and useful Improvements in Ceramic Materials, of which the following is a specification.

My invention relates to the manufacture of ceramic material, and refers particularly to the manufacture of bricks, tiles and other similar articles.

It is the object of my invention to produce bricks which will have a fine texture, possess a high tensile strength, absorb moisture only to a very small degree, and resist the action of frost.

The principal ingredients which enter into the manufacture of the products made according to my invention are silica, the oxid or other suitable salt of an earth metal or metals, and alkali, together with various impurities, such, for example, as iron. I use the term "earth metal" in a broad sense, and refer not only to the metals such as aluminum, to which this term is commonly applied, but also to the alkaline earth metals, such as calcium, magnesium, strontium, barium, and the like. I prefer, however, to use aluminum as the earth metal, since this element produces ceramic material of a better texture and finish than that produced by the other earth metals which I have mentioned. Under the term "alkali" I include the oxids or other suitable salts of metals, such as sodium, potassium and lithium.

The materials from which the bricks or other articles are made are preferably granite, clay, and sand, but it will be understood that other materials, such as feldspar, slag, or the like, may be used without departing from the spirit of my invention. The essential point is that the aggregate chemical composition of the materials used to produce the finished brick should be substantially within the limits which will be given hereafter.

In carrying out my invention I first crush the granite or other similar material to approximately the size of a man's fist, and place it within a kiln. It is next subjected to a low red heat so that it may subsequently be more readily crushed, while at the same time water of crystallization is expelled. If it is desired to obtain a brick of light color, a reducing flame is used to heat the granite, while if a brick of dark color is desired an oxidizing flame is used. In the former case the oxid of iron contained in the granite is reduced to the form of ferrous oxid (FeO), while in the latter the oxid is oxidized to ferric oxid ($Fe_2O_3$). The granite is next finely pulverized and mixed with the finely pulverized clay and sand. A portion of this sand is ground to be of sufficient fineness to pass through a 100-mesh screen, whereas the balance is coarser so that it will pass through a 40 to 60-mesh screen. The material is now mixed with water, molded, and placed in a kiln, where it is burned according to the usual well-known system.

The preferred composition of the finished material which I obtain is as follows: Silica—($SiO_2$)—65–85% (preferably 76%); alumina—($Al_2O_3$)—10–20% (preferably 15%); oxid of iron—(FeO or $Fe_2O_3$)—trace to 3% (preferably 1%); sodium or potassium oxid—($Na_2O$ or $K_2O$)—2.5–4% (preferably 3%).

It will be understood by those skilled in the art that the compounds given in the above table unite with each other to form silicates of complex composition, but, according to the usual system used in reporting chemical analyses, I have designated the various elements both in this table and in the claims which form part of this specification as oxids.

A typical analysis of the granite, clay and sand which I use in order to obtain brick, tile, or other similar material of the above-mentioned composition is as follows:

|  | Granite. | Clay. | Sand. |
|---|---|---|---|
| $SiO_2$ | 67.00 | 39.00 | 97.00 |
| $Al_2O_3$ | 18.00 | 43.00 | 2.00 |
| $Fe_2O_3$ | 2.00 | 2.00 | Tr. |
| CaO | Tr. | Tr. | 0.00 |
| MgO | Tr. | .50 | 0.00 |
| $K_2O$ | 6.29 | 1.50 | Tr. |
| $Na_2O$ | 4.73 | 0.00 | 0.00 |
| $H_2O$ | 1.00 | 13.00 | 0.00 |
|  | 99.02 | 99.00 | 99.00 |

When materials of the above analyses are used, I employ about 30% of granite, 20% of clay, and 50% of sand in order to obtain the finished material of desired analysis. As previously mentioned, a portion of the sand which I mix with the granite and clay is very finely pulverized, whereas the balance is much coarser. The fine sand is used in the eutectic ratio, that is sufficient quantity so that it is just enough, with the silica contained in the granite and clay, to form the silicates of the bases which I use, according to the following reactions:

$$Al_2O_3 + 3SiO_2 = Al_2(SiO_3)_3;$$
$$Fe_2O_3 + 3SiO_2 = Fe_2(SiO_3)_3;$$
$$K_2O + SiO_2 = K_2SiO_3.$$

On the assumption that 15% of alumina, 1% of oxid of iron, and 3% of potassium oxid are used, it will be found by the proper computation of comparative molecular weights that 26% of silica is necessary to form the aluminium silicate, $Al_2(SiO_3)_3$, 1% to form the ferric silicate, $Fe_2(SiO_3)_3$, and 2% to form the potassium silicate, $K_2SiO_3$, or a total of 29%, in order to be just sufficient to combine with all of the bases to form the corresponding silicates. This amount of silica I add in a finely pulverized condition, whereas the balance of coarse sand is for the purpose of forming a skeleton-like structure throughout the brick, tile, or other similar object.

In the manufacture of my improved product the potassium or other alkaline silicate is first formed at a comparatively low temperature. This fused silicate in turn acts as a catalytic agent, and assists in the formation of the silicates of the earth metals, such as aluminum, calcium, and the like, and also in the formation of the silicates of the other elements, such as iron, which may be present as impurities. The silicates of the earth metals and of the impurities, such as iron, are thereby formed at a lower temperature than that at which such silicates would be formed without the presence of a catalytic agent. The fusing temperatures of the silicates thus formed are considerably lower than the fusing point of pure silica, so that the desired reactions take place before the coarse sand is affected. By using the proportions I have mentioned there is a considerable difference, at least 150° C., between the temperature of vitrification, which is the temperature at which the silicates are formed, and the temperature of viscosity, which is the temperature at which the sand itself begins to melt. This is a point of great practical importance, since in this way it is unnecessary to watch the temperatures in the kiln nearly as closely as is the case in ordinary practice.

When the above-mentioned formula is employed for the manufacture of tiles or other similar objects which are comparatively thin, I have found it of great advantage to add a certain percentage of starch or other similar binding material to the water which is mixed with the pulverized materials before they are subjected to the final action of the kiln. Under ordinary circumstances 2% of starch mixed with the water is amply sufficient, and by its use the tiles may readily be handled without danger of breaking.

By using the formula mentioned above, I have found that in molding the bricks the process ordinarily known as the "stiff-mud process" may be employed, which consists in forcing the material through a die and subsequently cutting into desired lengths by wire. On account of the cheapness of this process it is a great advantage to be able to employ the same.

It will be apparent to those skilled in the art that many changes could be made in the details of my invention without departing from the spirit or scope thereof.

What I claim is:

1. As a new article of manufacture, ceramic material made from substances containing oxid of earth metal; oxid of alkali metal; finely divided silica in the eutectic ration to form the silicates of said earth metal and said alkali metal; and a relatively coarse material adapted to form the framework of the ceramic product and infusible at the temperature of formation of said silicates; substantially as described.

2. As a new article of manufacture, ceramic material made from substances containing alumina, oxid of alkali metal, finely divided silica in the eutectic ratio to form the silicates of the aluminum and said alkali metal, and a relatively coarse material adapted to form the framework of the ceramic product and infusible at the temperature of formation of said silicates, substantially as described.

3. As a new article of manufacture, ceramic material made from substances containing alumina, 10 to 20%, oxid of alkali metal 2.5 to 4%, finely divided silica in the eutectic ratio to form the silicates of the aluminum and said alkali metal, and relatively coarse silica adapted to form the framework of the ceramic product, substantially as described.

ANDREW MALINOVSZKY.

Witnesses:
HENRY M. HUXLEY,
H. H. RANDOLPH.